US012667514B1

(12) United States Patent
Yan

(10) Patent No.: US 12,667,514 B1
(45) Date of Patent: Jun. 30, 2026

(54) METHOD, SYSTEM AND ELECTRONIC DEVICE FOR MASSAGE DEVICE CONTROL BASED ON AI VIRTUAL CHARACTERS

(71) Applicant: SINGAPORE JOYHUB TECH PTE. LTD., Singapore (SG)

(72) Inventor: Fei Yan, Chengdu (CN)

(73) Assignee: SINGAPORE JOYHUB TECH PTE. LTD., Singapore (SG)

( * ) Notice: Subject to any disclaimer, the term of this patent is extended or adjusted under 35 U.S.C. 154(b) by 0 days.

(21) Appl. No.: 19/336,651

(22) Filed: Sep. 23, 2025

(30) Foreign Application Priority Data

Aug. 28, 2025   (CN) .......................... 202511221990.6

(51) Int. Cl.
    *A61H 19/00*     (2006.01)
    *A61H 23/02*     (2006.01)
    *G06F 40/40*     (2020.01)
    *G06T 11/00*     (2006.01)
    *G10L 13/02*     (2013.01)

(52) U.S. Cl.
    CPC ............. *A61H 19/00* (2013.01); *A61H 23/02* (2013.01); *G06T 11/00* (2013.01); *A61H 2201/5005* (2013.01); *A61H 2201/5007* (2013.01); *A61H 2201/5033* (2013.01);
    (Continued)

(58) Field of Classification Search
    CPC ........ A61H 19/00; A61H 19/30; A61H 19/32; A61H 19/34; A61H 19/40; A61H 19/44; A61H 19/50; A61H 23/00; A61H 23/004; A61H 23/006; A61H 23/008; A61H 23/02; A61H 23/0218; A61H 23/0236;

A61H 23/0245; A61H 23/0254; A61H 23/0263; A61H 23/04; A61H 23/06; A61H 2023/022; A61H 2023/0209; A61H 2023/0227;
(Continued)

(56) References Cited

U.S. PATENT DOCUMENTS

| | | | | |
|---|---|---|---|---|
| 2015/0366748 | A1* | 12/2015 | Cambridge ............ | A61H 19/32 600/38 |
| 2020/0276504 | A1* | 9/2020 | Liu ......................... | A63F 13/35 |
| 2022/0139169 | A1* | 5/2022 | He ......................... | A61H 19/00 463/16 |

FOREIGN PATENT DOCUMENTS

| | | |
|---|---|---|
| CN | 116775817 A | 9/2023 |
| CN | 117316143 A | 12/2023 |

(Continued)

*Primary Examiner* — Carrie R Dorna
(74) *Attorney, Agent, or Firm* — Ming Jiang; OPENPTO US LLC

(57)          ABSTRACT

A method, system and electronic device for massage device control based on AI virtual characters are provided. The method includes: presenting a target AI virtual character selected by a user; interacting with the user through the target AI virtual character; generating a control parameter based on interaction content, or generating a control parameter based on the interaction content combined with personalized features of the target AI virtual character and/or personalized features of the user; and controlling the user's massage device based on the control parameter. The method enhances the user's sense of participation and immersion, and causes the process of massage device control to be diverse and emotional, such that the user obtains a more exclusive and emotionally resonant experience during use, that is, the control process is more in line with the user's expectations and emotional state, and the fun of the control process is increased.

20 Claims, 4 Drawing Sheets

(52) U.S. Cl.
CPC ................ *A61H 2201/5043* (2013.01); *A61H 2201/5048* (2013.01); *G06F 40/40* (2020.01); *G10L 13/02* (2013.01)

(58) Field of Classification Search
CPC .... A61H 2023/0272; A61H 2023/0281; A61H 2023/0245
See application file for complete search history.

(56)                                       References Cited

FOREIGN PATENT DOCUMENTS

| | | | |
|---|---|---|---|
| CN | 118400214 | A | 7/2024 |
| CN | 118656455 | A | 9/2024 |

* cited by examiner

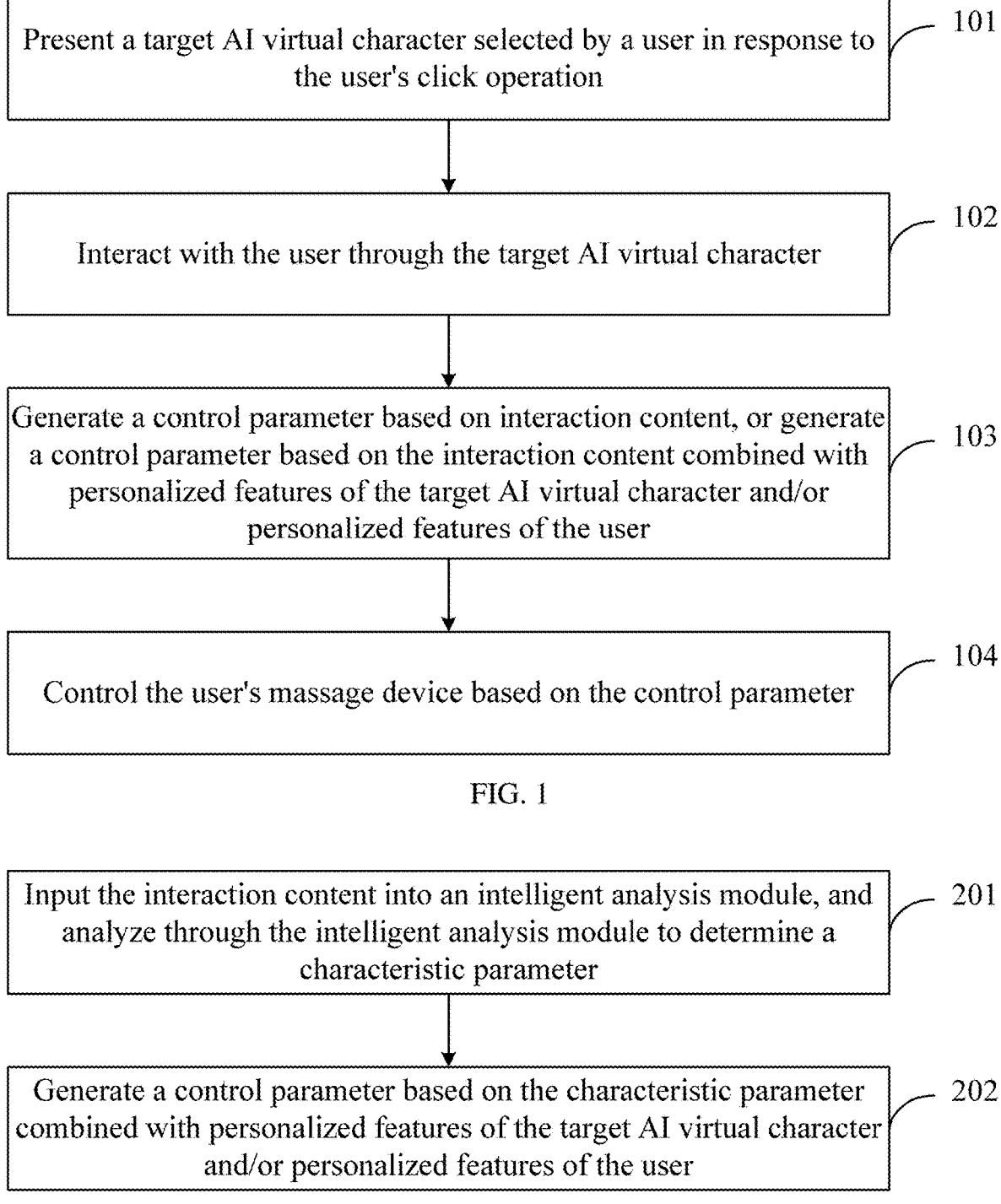

Present a target AI virtual character selected by a user in response to the user's click operation 101

Interact with the user through the target AI virtual character 102

Generate a control parameter based on interaction content, or generate a control parameter based on the interaction content combined with personalized features of the target AI virtual character and/or personalized features of the user 103

Control the user's massage device based on the control parameter 104

FIG. 1

Input the interaction content into an intelligent analysis module, and analyze through the intelligent analysis module to determine a characteristic parameter 201

Generate a control parameter based on the characteristic parameter combined with personalized features of the target AI virtual character and/or personalized features of the user 202

FIG. 2

METHOD, SYSTEM AND ELECTRONIC DEVICE FOR MASSAGE DEVICE CONTROL BASED ON AI VIRTUAL CHARACTERS

CROSS REFERENCE TO RELATED APPLICATIONS

The present application claims priorities of Chinese Patent Application No. 2025112219906, filed on Aug. 28, 2025, the contents of which are hereby incorporated by reference in entirety.

TECHNICAL FIELD

The present disclosure relates to the technical field of artificial intelligence, and in particular to a method, system and electronic device for massage device control based on AI virtual characters.

BACKGROUND

With technological advancements, massage devices have gradually become popular in the market, and are evolving towards intelligence and personalization. Traditional massage devices mostly employ fixed control modes, and users perform limited parameter control (such as a vibration frequency and intensity) only through simple buttons or remote controls, thereby making it difficult to meet the personalized needs of different users in different scenarios, such that interactive experiences remain relatively monotonous.

To enhance user experience, voice control, or mobile APP control, and other control modes are introduced for some massage devices, which increases the convenience of operation to a certain extent, but such massage devices still lack deep emotional interactions and personalized adaptation capabilities. During use, the user usually needs to actively set specific parameters, and the interaction process lacks fun and immersion.

Additionally, AI technology has been widely applied in the fields of entertainment, services, and the like, which enables to achieve natural and smooth conversations with the users. However, although AI technology has been combined with a massage device, AI technology is used only to identify the user's control needs to control the massage device, e.g., matching control is achieved by identifying keywords in the user's dialogue information.

In summary, the prior art methods for control of massage devices are difficult to achieve deep response and precise matching with user needs. That is, such methods lack sufficient personalized adaptation capabilities, and emotional connection and immersion, resulting in that massage devices always have shortcomings in the intelligence and interactivity and cannot meet users' pursuit of more humanized and emotional use experiences.

SUMMARY

In order to solve the technical problems existing in the prior art, the present disclosure provides a method, system and electronic device for massage device control based on AI virtual characters.

In a first aspect, the present disclosure provides a method for massage device control based on AI virtual characters, and the method includes: presenting a target AI virtual character selected by the user in response to the user's click operation, where different AI virtual characters have personalized features generated by cloning based on input data of a corresponding target character; interacting with the user through the target AI virtual character; generating a control parameter based on interaction content, or generating a control parameter based on the interaction content combined with personalized features of the target AI virtual character and/or personalized features of the user; and controlling the user's massage device based on the control parameter.

Optionally, an AI virtual character is constructed through the following steps, including: acquiring input data of a target character, where the input data includes voice data and text data of the target character; analyzing the input data of the target character to determine personalized features of the target character, where the personalized features of the target character include a timbre, tone, and language style of the target character; and constructing an AI virtual character corresponding to the target character according to the personalized features of the target character.

Optionally, the input data further includes character acquisition data of the target character; the constructing an AI virtual character corresponding to the target character according to the personalized features of the target character further includes: analyzing the character acquisition data of the target character to determine the personalized features of the target character, where the personalized features of the target character further include behavioral habits of the target character; determining a virtualized modeling image corresponding to the target character according to the character acquisition data of the target character; and constructing an AI virtual character corresponding to the target character according to the personalized features of the target character and the virtualized modeling image corresponding to the target character.

Optionally, the input data further includes image data of the target character; the method further includes: determining aesthetic preferences of the target character according to the image data and the character acquisition data of the target character; and determining a scenario background of the AI virtual character corresponding to the target character according to the aesthetic preferences of the target character.

Optionally, the personalized features of the target character include the language style of the target character; and the interacting with the user through the target AI virtual character includes: outputting a text dialogue response through the target AI virtual character according to the input content of the user, where the text dialogue response is text dialogue content that conforms to the language style of the target character and is output by the target AI virtual character.

Optionally, the personalized features of the target character include the timbre and tone of the target character; and the interacting with the user through the target AI virtual character includes: outputting a voice dialogue response through the target AI virtual character according to the input content of the user, where the voice dialogue response is synthesized voice content that conforms to the timbre and tone of the target character and is output by the target AI virtual character.

Optionally, the personalized features of the target character further include behavioral habits of the target character; and the method further includes: driving the target AI virtual character to perform expressions and actions that conform to the behavioral habits of the target character during the interaction.

Optionally, the personalized features of the user include at least one of the user's age, gender, preference settings, data of using the massage device, and physiological response feedback.

Optionally, the generating a control parameter based on the interaction content combined with personalized features of the target AI virtual character and/or personalized features of the user includes: inputting the interaction content into an intelligent analysis module, and analyzing through the intelligent analysis module to determine a characteristic parameter, where the characteristic parameter represents an emotion category extracted from the interaction content; and generating a control parameter based on the characteristic parameter combined with personalized features of the target AI virtual character and/or personalized features of the user.

Optionally, the characteristic parameter represents an emotion category of the target AI virtual character extracted from the interaction content.

Optionally, the generating a control parameter based on the characteristic parameter combined with personalized features of the target AI virtual character and personalized features of the user includes: determining a personality tag of the target AI virtual character according to the personalized features of the target AI virtual character, where the personality tag of the target AI virtual character corresponds to a stimulation parameter preset by the target character, or the personality tag of the target AI virtual character corresponds to a stimulation parameter set by the system; generating an initial control parameter based on the stimulation parameter corresponding to the personality tag of the target AI virtual character and the characteristic parameter; and adjusting the initial control parameter based on the personalized features of the user to obtain the control parameter.

Optionally, the generating a control parameter based on the characteristic parameter combined with personalized features of the target AI virtual character and personalized features of the user includes: generating a first control parameter based on the characteristic parameter and the personalized features of the target AI virtual character; generating a second control parameter based on the personalized features of the user; and generating the control parameter by performing weighted calculation on the first control parameter and the second control parameter.

Optionally, the generating a control parameter based on the characteristic parameter combined with personalized features of the target AI virtual character and personalized features of the user includes: generating the control parameter by inputting the characteristic parameter, the personalized features of the target AI virtual character, and the personalized features of the user into a pre-constructed multi-modal analysis model.

Optionally, the method further includes: automatically generating a personalized image and/or a short video clip based on the process of interaction between the target AI virtual character and the user; and storing the personalized image and/or the short video clip.

Optionally, the AI virtual character is continuously updated based on the latest input data of a corresponding target character.

Optionally, the control parameter includes at least one of a vibration frequency, a vibration amplitude, a vibration duration, a massage device temperature, and a massage direction.

Optionally, the method further includes: When it is detected that the user triggers a preset hidden mechanism associated with the target AI virtual character, interactive presentation is performed through the target AI virtual character.

Optionally, the preset hidden mechanism includes at least one of the following: setting a first keyword or a first interactive operation to trigger unlocking of a predefined expression for the target AI virtual character; setting a second keyword or a second interactive operation to trigger unlocking of a predefined voice clip by the target AI virtual character; setting a third keyword or a third interactive operation to trigger switching to a predefined outfit for the target AI virtual character; and setting a fourth keyword or a fourth interactive operation to trigger generation of the stimulation parameter preset by the target character for the target AI virtual character.

In a second aspect, the present disclosure provides a system for massage device control based on AI virtual characters, and the system includes: a presentation module, configured to present a target AI virtual character selected by the user in response to the user's click operation, where different AI virtual characters have personalized features generated by cloning based on input data of a corresponding target character; an interaction module, configured to interact with the user through the target AI virtual character; a generation module, configured to generate a control parameter based on interaction content, or generate a control parameter based on the interaction content combined with personalized features of the target AI virtual character and/or personalized features of the user; and a control module, configured to control the user's massage device based on the control parameter.

In a third aspect, the present disclosure provides an electronic device, including: a processor; the processor is configured to execute a computer program to implement the following method steps including: presenting a target AI virtual character selected by the user in response to the user's click operation, where different AI virtual characters have personalized features generated by cloning based on input data of a corresponding target character; interacting with the user through the target AI virtual character; generating a control parameter based on interaction content, or generating a control parameter based on the interaction content combined with personalized features of the target AI virtual character and/or personalized features of the user; and controlling the user's massage device based on the control parameter.

The present disclosure has the following beneficial effects: First, the method of interacting with the user through an AI virtual character and controlling the massage device during the interaction, replaces traditional methods of control by buttons, remote control or manual control through an APP, and the method of response control based on emotional communication enhances the user's sense of participation and immersion, and causes the process of massage device control to be diverse and emotional.

Second, different target characters may be cloned to generate different AI virtual characters, such that different AI virtual characters are endowed with different personalized attributes. In this case, the user may choose an interaction object that meets his/her psychological expectations according to his/her preferences, which may overcome the prior art problem of interaction object homogenization, such that the user obtains a more exclusive and emotionally resonant experience during use, thereby enhancing the user's psychological adaptability and usage stickiness.

Third, a control parameter is generated based on the interaction content, or generated in combination with the personalized features of the target AI virtual character and/or the personalized features of the user. That is, a control parameter may be generated through multi-dimensional data fusion in a way of combining a current dialogue scenario, the AI virtual character's personality and/or the user's personality, resulting in that the control process is more in line with the user's expectations and emotional state, and the fun of the control process is increased. In this case, the target AI virtual character is equivalent to a sexual partner with a unique personality (and the unique personality is associated with the corresponding target character), and as an interaction with the target AI virtual character proceeds, the target AI virtual character continuously stimulates the user in a manner consistent with his/her personality.

BRIEF DESCRIPTION OF THE DRAWINGS

FIG. 1 is a flowchart of steps of a method for massage device control based on AI virtual characters provided in an embodiment of the present disclosure.

FIG. 2 is a flowchart of steps of another method for massage device control based on AI virtual characters provided in an embodiment of the present disclosure.

Figure 3:
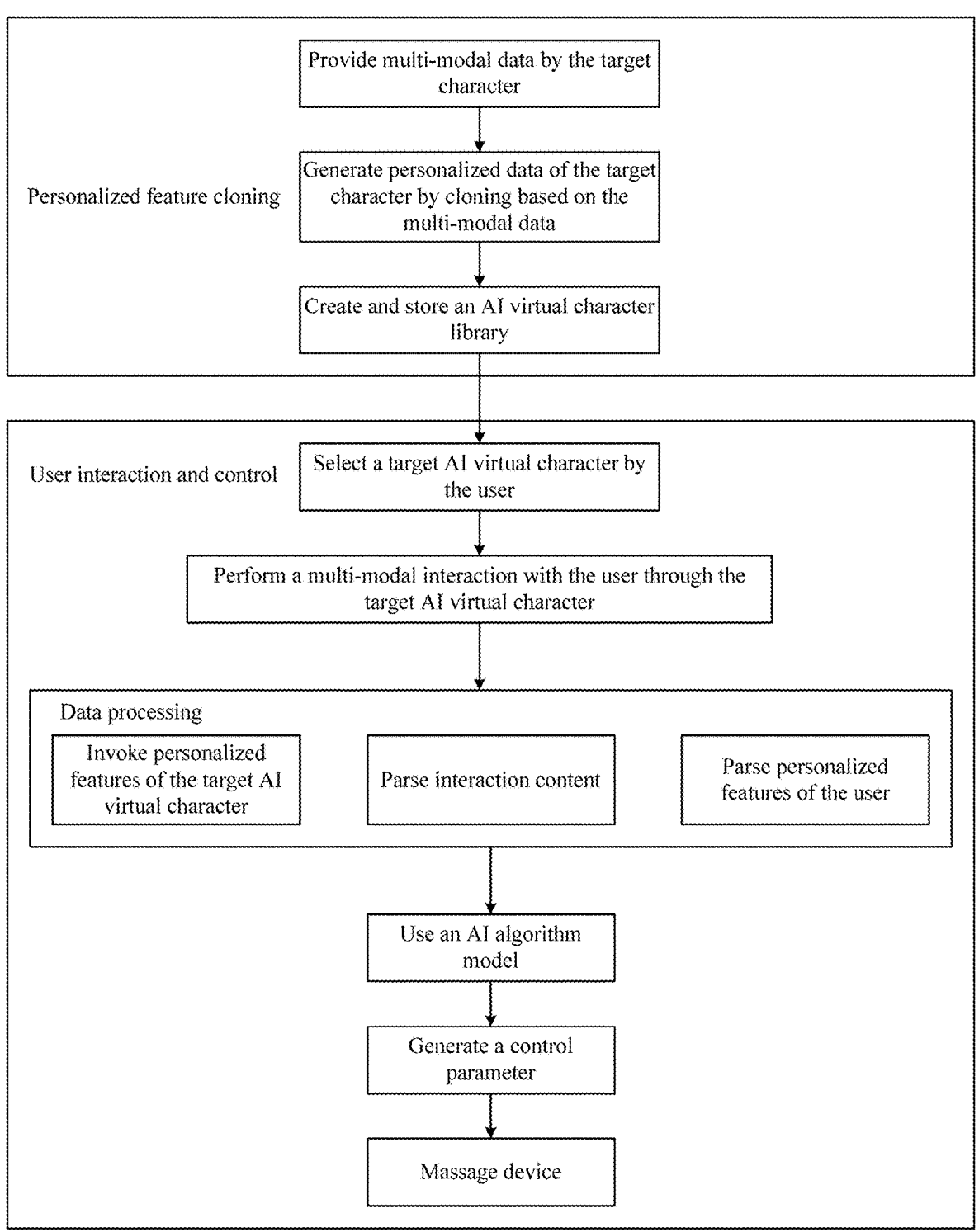
FIG. 3 is a schematic diagram of a complete process of a method for massage device control based on AI virtual characters provided in an embodiment of the present disclosure.

DETAILED DESCRIPTIONS OF THE
EMBODIMENTS

In the following description, specific details, such as specific system structures and technology, are set forth for the purpose of explanation rather than limitation, so as to thoroughly understand embodiments of the present disclosure. However, it should be understood by those skilled in the art that the present disclosure may be implemented in other embodiments without these specific details. In other instances, detailed descriptions of well-known systems, devices, circuits and methods are omitted so as to prevent unnecessary details from obscuring the description of the present disclosure.

Moreover, in the description of the specification and the appended claims of the present disclosure, the terms "first", "second", "third", and the like are used merely to distinguish between descriptions and may not be construed as indication or implication of relative importance.

The prior art methods for control of massage devices are difficult to achieve deep response and precise matching with user needs. That is, such methods lack sufficient personalized adaptation capabilities, and emotional connection and immersion, resulting in that massage devices always have shortcomings in the intelligence and interactivity and cannot meet users' pursuit of more humanized and emotional use experiences.

In view of the above problems, the present disclosure provides the following embodiments to solve the above technical problems.

With reference to FIG. 1, a method for massage device control based on AI virtual characters is provided in the present disclosure, and the method specifically includes: steps 101 to 104.

Step 101: present a target AI virtual character selected by a user in response to the user's click operation.

Different AI virtual characters have personalized features generated by cloning based on input data of a corresponding target character. That is, different AI virtual characters have different personalized features, and personalized features of each AI virtual character are generated by cloning based on input data of different target characters.

The personalized features may be used to distinguish character attributes of different AI virtual characters. Each target character may generate a matching AI virtual character according to their own input data. The target characters mentioned herein may refer to internet celebrities, online influencers, streamers, models, and the like. After the matched AI virtual characters are constructed, the target characters may be released for selection by a user.

Notably, an AI virtual character library may be pre-constructed, AI virtual characters released by different target characters may be stored in the AI virtual character library, and the user may select a desired target AI virtual character from the AI virtual character library.

When the user clicks on an AI virtual character, the target AI virtual character selected by the user is presented on a device interface.

Step 102: interact with the user through the target AI virtual character.

After the target AI virtual character is presented, the user may interact therewith in real time. Modes of the interaction are not limited, and may include a text-based interaction, a voice-based interaction, or a video-based interaction.

Step 103: generate a control parameter based on interaction content, or generate a control parameter based on the interaction content combined with personalized features of the target AI virtual character and/or personalized features of the user.

During an interaction between the target AI virtual character and the user, the interaction content may be analyzed in real time, or the personalized features of the target AI virtual character and/or the personalized features of the user may be combined to generate a control parameter.

The above step may include the following situations:

1. Generate a control parameter based on the interaction content by analyzing the interaction content in real time. For example, when keywords representing the user's control instructions (such as "increase intensity" or "slow down") are identified in the interaction content, a control parameter is directly generated based on these keywords.

2. Generate a control parameter by analyzing the interaction content in real time and combining the personalized features of the target AI virtual character.

For example, control parameters generated based on the same interaction content vary for a gentle AI virtual character and a lively AI virtual character respectively.

3. Generate a control parameter by analyzing the interaction content in real time and combining the personalized features of the user.

For example, control parameters generated based on the same interaction content vary for different user groups.

4. Generate a control parameter by analyzing the interaction content in real time and combining the personalized features of the target AI virtual character and the personalized features of the user.

Additionally, it should be noted that the prerequisite for the above steps may be to detect that the user is using a massage device. That is, when it is detected that the user is using the massage device, a control parameter is generated by analyzing the interaction content in real time or combining the personalized or the target AI virtual character and/or the personalized features of the user.

Step 104: control the user's massage device based on the control parameter.

Finally, the generated control parameter is sent to the massage device being used by the user to control the massage device, so as to stimulate the user.

It should be noted that the control parameters mentioned herein may be adjusted to control the massage device currently in use (e.g., the control parameter is used to increase a current vibration frequency of the massage device by 10 Hz), or to control the massage device only in a power-on state (e.g., the control parameter is used to control the massage device to vibrate at a vibration frequency of 40 Hz).

In the embodiments of the present disclosure, massage devices include adult-use and physiotherapy and rehabilitation massage devices.

The adult-use massage devices include: insertable vibration devices, simulative massage devices, external vibration devices, and ejaculation-delay devices.

For example, the insertable vibration devices may specifically include: vibrating rods, egg-shaped vibrators, anal plugs, double-headed vibrators, and the like.

The simulative massage devices may specifically include: simulated penis structures, simulated anatomical molds, inflatable dolls, and the like.

The external vibration devices may include: breast massagers, masturbation cups, vibrating rings, and the like.

The ejaculation-delay devices may specifically include: penile constriction rings, penis trainers, and the like.

The physiotherapy and rehabilitation massage devices include full-body massage devices and specialized local massage devices.

For example, the full-body massage devices may specifically include: massage chairs, massage bathtubs, and the like.

The specialized local massage devices may specifically include head massagers, neck massagers, shoulder massagers, leg massagers, facial massagers, and the like.

An adult-use massage device is taken as an example below to illustrate a complete process of use: First, when the user enters an application, and a plurality of AI virtual characters (such as names, thumbnails, IDs) may be displayed on an application interface, after the user selects a target AI virtual character by clicking, the target AI virtual character is presented on the interface, and then the user may interact with the target AI virtual character. During an interaction between the user and the target AI virtual character, a control parameter is generated in real time to control the massage device being used by the user, so as to provide feedback and stimulate the user. In this case, the target AI virtual character is equivalent to a sexual partner with a unique personality (and the unique personality is associated with the corresponding target character), and as a dialogue interaction with the target AI virtual character proceeds, the user is continuously stimulated in a manner consistent with his/her personality.

In summary, the present disclosure provides a method for massage device control based on AI virtual characters, a core of which lies in that the user may interact with an AI virtual character generated based on input data of a target character, and a control parameter is generated during this process to control the massage device being used by the user, so as to stimulate the user, but this method has the following advantages:

First, the method of interacting with the user through an AI virtual character and controlling the massage device during the interaction, replaces traditional methods of control by buttons, remote control or manual control through an APP, and the method of response control based on emotional communication enhances the user's sense of participation and immersion, and causes the process of massage device control to be diverse and emotional.

Second, different target characters may be cloned to generate different AI virtual characters, such that different AI virtual characters are endowed with different personalized attributes. In this case, the user may choose an interaction object that meets his/her psychological expectations according to his/her preferences, which may overcome the prior art problem of interaction object homogenization, such that the user obtains a more exclusive and emotionally resonant experience during use, thereby enhancing the user's psychological adaptability and usage stickiness.

Third, a control parameter is generated based on the interaction content, or generated in combination with the personalized features of the target AI virtual character and/or the personalized features of the user. That is, a control parameter may be generated through multi-dimensional data fusion in a way of combining a current dialogue scenario, the AI virtual character's personality and/or the user's personality, resulting in that the control process is more in line with the user's expectations and emotional state, and the fun of the control process is increased. In this case, the target AI virtual character is equivalent to a sexual partner with a unique personality (and the unique personality is associated with the corresponding target character), and as an interaction with the target AI virtual character proceeds, the target AI virtual character continuously stimulates the user in a manner consistent with his/her personality.

Optionally, an AI virtual character is constructed through the following steps, including: acquire input data of a target character, where the input data includes voice data and text data of the target character; analyze the input data of the target character to determine personalized features of the target character, where the personalized features of the target character include a timbre, tone, and language style of the target character; and construct an AI virtual character corresponding to the target character according to the personalized features of the target character.

The voice data may include pronunciation data of the target character acquired by a recording device in different scenarios, such as daily conversations and speeches in different emotion conditions (e.g., happy, serious, and angry). The voice data may further include audio recordings uploaded by the user, including voice clips of different speech rates and volumes. The voice data may further include speech data of the target character extracted from videos containing the target character.

The text data may include status updates, comments and messages posted by the target character on social platforms, or chat records, article creations, and the like of the target character.

Then, the above two types of data are analyzed to determine the personalized features of the target character.

The timbre and tone of the target character may be determined mainly by analyzing the voice data of the target character. The timbre may include sound characteristics such as being low, crisp, hoarse, and sweet. The tone may refer to a pitch and rhythm of voice and correspond to a speaking state under different emotion conditions.

The language style of the target character may be determined by analyzing the text data and the voice data of the target character. The language style mentioned herein may include a speaking style and a writing style, where the speaking style may refer to the target character's catch-phrases, preference for dialects, preference for English words, and the like, and the writing style may refer to the user's word preference, sentence structure, and the like.

Finally, an AI virtual character corresponding to the target character is constructed according to the personalized features of the target character, such that the AI virtual character may simulate the timbre, tone and language style of the target character. During an interaction between the AI virtual character and the user, the user feels like interacting with the target character, which enhances the authenticity of the interaction and the emotional connection with the user. The user may choose different AI virtual characters according to his/her preferences, which meets the user's demand for personalized interaction objects and also improves the recognizability of the AI virtual character (having the timbre, tone, and language style of the target character).

Optionally, the input data further includes character acquisition data of the target character;

the constructing an AI virtual character corresponding to the target character according to the personalized features of the target character further includes: analyze the character acquisition data of the target character to determine the personalized features of the target character, where the personalized features of the target character further include behavioral habits of the target character; determine a virtualized modeling image corresponding to the target character according to the character acquisition data of the target character; and construct an AI virtual character corresponding to the target character according to the personalized features of the target character and the virtualized modeling image corresponding to the target character.

The character acquisition data of the target character may include but is not limited to, video data, 3D scanning data, capture data recorded by a motion capture system, and the like.

The video data of the target character may be acquired by a camera, a webcam, and other devices, including dynamic images of the target character in different scenarios, such as body movements, facial expressions, and posture habits during daily communication.

The 3D scanning data may be acquired by a professional 3D scanner, a professional facial scanner, and other scanners.

The acquired character acquisition data of the target character is analyzed to determine the behavioral habits of the target character. The behavioral habits mentioned herein may include, but are not limited to, habitual actions made when speaking (such as gestures made when speaking, head tilting when confused), facial expression features under different emotion conditions (such as frowning when angry), and the like.

It should be noted that the present disclosure introduces the character acquisition data of the target character for two purposes: first, appearance features of the target character (such as a hairstyle, a facial contour, facial features, a clothing style, and a height proportion) are identified from the character acquisition data, and then a virtualized modeling image of the target character is constructed. This image may be presented as a 2D animated image or a 3D virtual model, which enables to restore visual features of the target character, and makes the AI virtual character more concrete in visual presentation. Second, on the basis of the timbre, tone, and language style of the target character, the behavioral habits of the target character are further integrated to achieve multi-dimensional restoration of the target character. For example, when the AI virtual character says "nice to meet you", a "smile+wave" action derived from video analysis is simultaneously triggered. It can be seen that the above method enhances the three-dimensionality and authenticity of the AI virtual character, as well as the immersion of the interaction.

For the above solution, a live streaming application scenario is provided, and for example, the user's massage device currently used may be linked with a streamer who is hosting live streaming; but after the streamer goes offline, the user, when still expecting to link with the streamer, has to wait for the streamer to go online again, thereby missing an optimal moment for meeting the user's demand; and therefore, according to the method provided by the present disclosure, the streamer may upload a live streaming video to generate a target AI virtual character corresponding to the streamer. Then, even after the streamer goes offline, the user may still interact with the target AI virtual character corresponding to the streamer, and link with the user's massage device during the interaction. This method enables to meet the user's needs for linking and using the massage device at various time periods, while delivering an experience of interactive linkage with the streamer.

Optionally, the input data further includes image data of the target character; the method of the present disclosure further includes: determine aesthetic preferences of the target character according to the image data and the character acquisition data of the target character; and determine a scenario background of the AI virtual character corresponding to the target character according to the aesthetic preferences of the target character.

The image data may include daily photos of the target character, images posted on social media, snapshots of life scenes, and personally collected images. The image data may reflect the target character's living environment, interest tendencies, aesthetic orientation, and other information from a visual perspective.

The aesthetic preferences of the target character are mined according to the image data and the character acquisition data, and the scenario background is designed accordingly, such that a presentation environment of the AI virtual character is highly matched with the aesthetic tendency. This method ensures that the "scenario background" of the AI virtual character is more in line with the user's cognitive expectations of the target character, and the user feels more coordinated and comfortable visually, thereby enhancing the immersion during interaction.

Optionally, when the personalized features of the target character include the language style of the target character, the interacting with the user through the target AI virtual character includes: output a text dialogue response through the target AI virtual character according to the input content of the user, where the text dialogue response is text dialogue content that conforms to the language style of the target character and is output by the target AI virtual character.

That is, a text dialogue response method is provided in this embodiment, and specifically, after the user inputs content (such as a question, a statement, or an instruction) in text and voice (converted to text), and other forms, semantic understanding of the input content is first performed to clarify the user's intention. Then, a text dialogue response is generated in combination with the language style of the target character, such that the text response content is consistent with the language style of the target character in terms of word selection, sentence structure, emotional color, and the like. For example, when the user inputs the content of "I'm so tired today", the AI virtual character may respond with a text dialogue like "take a good rest today, okay?".

Optionally, when the personalized features of the target character include the timbre and tone of the target character, the interacting with the user through the target AI virtual character includes: output a voice dialogue response through the target AI virtual character according to the input content of the user, where the voice dialogue response is synthesized voice content that conforms to the timbre and tone of the target character and is output by the target AI virtual character.

That is, a voice dialogue response method is provided in this embodiment, and specifically, after the user inputs content (such as text content or voice content, where the voice content needs to be converted to the text content for semantic understanding), the user's intention is first parsed to generate matching text response content. Then, the text response is converted into voice content, and the timbre and tone of the target character are invoked, such that the synthesized voice is highly consistent with real voice of the target character in terms of auditory sense. When the timbre of the target character is characterized by "gentle female voice" and the tone is characterized by "moderate speech rate, slightly rising inflection at the end of the sentence", the synthesized voice content of "How do you feel today?" may be output based on the timbre and tone of the target character.

Optionally, when the personalized features of the target character further include the behavioral habits of the target character, the method of the present disclosure further includes: drive the target AI virtual character to perform expressions and actions that conform to the behavioral habits of the target character during the interaction.

Specifically, during the interaction, the current dialogue content and context are associated in real time, and corresponding expression and action instructions are triggered in combination with the behavioral habits of the target character. For example, when the AI virtual character outputs an affirmative response, if the target character has a behavioral habit of "nodding and smiling", the AI virtual character is driven to perform the action simultaneously; and when key content is mentioned, if the target character is accustomed to "raising hands to emphasize", the AI virtual character performs a hand-raising action in cooperation with a voice response. Expressions and actions are synchronized with the voice response in time, and a combination of "voice+expression+action" is formed, such that a behavioral expression of the AI virtual character is highly consistent with the style and habits of the target character, thereby enhancing the vividness and authenticity of the AI virtual character.

Additionally, when the AI virtual character is constructed, a dialogue logic of the user may be analyzed based on voice data, text data, and/or video data of the target character. For example, a text dialogue process (including chatting records and comments) is screened from the text data of the target character to learn a text dialogue logic of the target character; and for another example, a voice dialogue process (including a dialogue and daily communication with the audience) is screened from the voice data or the video data of the target character to learn a speaking logic of the target character.

Furthermore, during the interaction between the target AI virtual character and the user, an answer is generated based on the learned dialogue logic of the target character.

The process of massage device control is described below:

Optionally, the control parameter includes at least one of a vibration frequency, a vibration amplitude, a vibration duration, a massage device temperature, and a massage direction.

A generated control parameter, such as the vibration frequency, may increase by 10 Hz, or the vibration duration may extend by 15 s. Notably, the control parameter may also be a combination of the above plurality of parameters, which is not limited in the present disclosure.

Optionally, the personalized features of the user include at least one of the user's age, gender, preference settings, data of using the massage device, and physiological response feedback.

The age and the gender are basic parameters representing the user's physiology and psychology. Users of different ages vary in demand for the massage device, acceptance levels, and somatosensory preferences. Users of different genders vary in functional needs and sensitivities.

Preference settings may be proactively provided by the user, including but not limited to preferences for a vibration intensity, the vibration frequency, the vibration duration, and the like.

The data of using the massage device may be automatically acquired during use of the massage device by the user each time, including a use time period, a use duration, and commonly used control parameters, where these data objectively reflect the user's usage habits and potential needs.

For the physiological response feedback, the user's physiological data such as heart rate changes, galvanic skin response, muscle tension, and the like may be acquired during use of the massage device by the user each time. These data directly reflect the user's physiological state during use.

The personalized features of the user are collected such that subsequently generated control parameters are more in line with the user's needs, thereby enhancing the user's use experience.

Optionally, with reference to FIG. 2, the generating a control parameter based on the interaction content combined with personalized features of the target AI virtual character and/or personalized features of the user may specifically include: steps 201 to 202.

Step 201: input the interaction content into an intelligent analysis module, and analyze through the intelligent analysis module to determine a characteristic parameter.

The characteristic parameter represents an emotion category extracted from the interaction content.

The emotion category may include but is not limited to: happiness, tension, fatigue, pain, comfort, excitement, and the like.

The characteristic parameter may further quantitatively represent the emotion category in a numerical range (such as 1-5, where 1 represents "negative/depressed" and 5 represents "positive/excited").

The above intelligent analysis module may include but is not limited to an AI model, a machine learning model, a deep learning model, a reinforcement learning model, and the like.

Step 202: generate a control parameter based on the characteristic parameter combined with personalized features of the target AI virtual character and/or personalized features of the user.

After the emotion category is identified, a control parameter is generated by combining the personalized features of the target AI virtual character and the personalized features of the user.

For example, when representing an emotion of "excitement", the characteristic parameter may correspond to a higher vibration frequency and intensity; and when representing an emotion of "calm", the characteristic parameter may correspond to a lower vibration frequency and a soothing mode.

Combining the personalized features of the target AI virtual character: For example, personalized features of a gentle AI virtual character may limit that the vibration intensity, that is, the vibration intensity does not exceed a certain threshold even when the emotion is "excitement"; and when the emotion of a lively AI virtual character is "excitement", a more rhythmic parameter may be generated.

Combining the personalized features of the user: For example, when the user prefers a "gentle mode", even if the characteristic parameter represents the emotion of "excitement", the generated vibration intensity adapts to this preference; and when historical data of use by the user indicates a high acceptance of a "high-frequency vibration mode", this mode is preferentially selected under the condition of a corresponding emotion.

It can be seen that the above method may achieve the real-time linkage between massage device control and emotions through a synergistic effect of multi-dimensional data, which improves the accuracy of interaction, and enhances the emotional interaction experience.

Optionally, the characteristic parameter represents an emotion category of the target AI virtual character extracted from the interaction content.

Embodiment 1: When the user's input data is "I'm so happy to chat with you", the reply data from the target AI virtual character is "I'm glad to win your approval". The intelligent analysis module performs emotion recognition based on the reply data of "I'm glad to win your approval", to determine the emotion category of the target AI virtual character: happiness.

That is, in this way, a control parameter is generated based on the emotion category of the target AI virtual character, which enhances the personification of the AI virtual character, and enriches the bidirectional emotional interaction, thereby enhancing the user's immersion of use.

Notably, the above characteristic parameter represents an emotion category of the user extracted from the interaction data.

Optionally, the generating a control parameter based on the characteristic parameter combined with personalized features of the target AI virtual character and personalized features of the user includes: determine a personality tag of the target AI virtual character according to the personalized features of the target AI virtual character, where the personality tag of the target AI virtual character corresponds to a stimulation parameter preset by the target character, or the personality tag of the target AI virtual character corresponds to a stimulation parameter set by the system; generate an initial control parameter based on the stimulation parameter corresponding to the personality tag of the target AI virtual character and the characteristic parameter; and adjust the initial control parameter based on the personalized features of the user to obtain the control parameter.

The personality tag summarizes core features of the AI virtual character, and for example, the personality tag may be determined as "gentle and considerate" according to the language style (such as a gentle tone and soothing words), behavioral habits (such as slow movements and smiling expressions) and other personalized features of the gentle virtual character; and the personality tag may be determined as "enthusiastic and vigorous" according to a lively tone, fast movements and other data of the lively virtual character.

The above tags are directly associated with stimulation parameters: The stimulation parameter preset by the target character is preset by the target character (e.g., "gentle and considerate" corresponds to a parameter of "a low vibration frequency, a low vibration intensity, sustained and stable"); and the stimulation parameter set by the system is automatically matched by the system according to the tag features (e.g., "enthusiastic and vigorous" corresponds to a parameter of "high-frequency fluctuation, and intensity gradient modulation").

Then, the initial control parameter is generated based on the characteristic parameter and the stimulation parameter corresponding to the personality tag of the target AI virtual character. That is, the initial control parameter is generated by analyzing the emotion category and the stimulation parameter corresponding to the personality tag. Then, a final control parameter is obtained by adjusting the initial control parameter based on the personalized features of the user as a constraint. The above method ensures the consistency between the control parameter and the AI virtual character's "personality", enhances the personification experience during the interaction, and ensures a process of stimulation within the user's tolerance range and demand range with the user's personalized features as the constraint.

Optionally, the generating a control parameter based on the characteristic parameter combined with personalized features of the target AI virtual character and personalized features of the user includes: generate a first control parameter based on the characteristic parameter and the personalized features of the target AI virtual character; generate a second control parameter based on the personalized features of the user; and generate the control parameter by performing weighted calculation on the first control parameter and the second control parameter.

Weight values for the first control parameter and the second control parameter may be set according to requirements, and for example, a weight value corresponding to the first control parameter is 0.6, and a weight value corresponding to the second control parameter is 0.4.

It should be noted that the first control parameter ensures that the massage device control is consistent with an emotional atmosphere of real-time interaction and a style of the AI virtual character, the second control parameter focuses on the user's stable preferences and physiological characteristics, and the weighted calculation flexibly balances the two control parameters through weight allocation. This mode avoids the limitations of a single dimension (e.g., the user's longstanding habits may be ignored for parameter generation only based on an interaction atmosphere, and parameter generation only based on user data may result in lack of scene adaptability), such that a final parameter generated not only applies to a current interaction scenario, but also accurately matches the user's individual needs, thereby enhancing the coordination of experience.

In an embodiment, the above characteristic parameter may include both the emotion category of the target AI virtual character and the emotion category of the user. Furthermore, the first control parameter may be generated based on the emotion category of the target AI virtual character and the personalized features of the target AI virtual character, and the second control parameter may be generated based on the emotion category of the user and the personalized features of the user.

Optionally, the generating a control parameter based on the characteristic parameter combined with personalized features of the target AI virtual character and personalized features of the user includes: generate the control parameter by inputting the characteristic parameter, the personalized features of the target AI virtual character, and the personalized features of the user into a pre-constructed multi-modal analysis model.

The above multi-modal analysis model may be a comprehensive analysis model constructed based on deep learning technology (such as a neural network, a Transformer model, and the like), and its core feature lies in that a plurality of different types of data may be processed and integrated simultaneously. In the present disclosure, training data for the model includes characteristic parameters (emotion category data), personalized features of the target AI virtual character (such as a language style, behavioral habits, timbre, tone, and the like.), personalized features of the user (such as age, gender, preference settings, usage records, physiological response feedback, and the like) in a large number of historical interaction cases, as well as corresponding optimal control parameters. Through training, the model learns rules of correlation between different modal data, forms a relationship of mapping from input data to output control parameters, and has the capability to comprehensively analyze multi-dimensional information and generate precise parameters.

Optionally, the method of the present disclosure further includes: automatically generate a personalized image and/or a short video clip based on the process of interaction between the target AI virtual character and the user; and store the personalized image and/or the short video clip.

The personalized image may be a static image generated by combining an interaction scenario, features of the target AI virtual character, and dialogue content, including representative expressions or actions of the target AI virtual character (such as smiling and waving) captured during a dialogue; and the short video clip is a short video formed by synchronously recording the dynamic performance (such as continuous expression changes and action demonstrations) and voice content of the target AI virtual character during the interaction, where a duration of short video clip may range from tens of seconds to several minutes. This method enables to retain interaction memories, enhances emotional connection, and facilitates review and collection by the user, thereby enhancing user stickiness.

Optionally, the AI virtual character is continuously updated based on the latest input data of a corresponding target character.

That is, the target character may continuously update and optimize the AI virtual character, and in this process, update and optimization may be triggered actively or passively. For example, the target character uploads the latest input data to passively trigger the update and optimization of the AI virtual character. Alternatively, the latest live streaming content of the target character (such as a streamer) may be actively acquired, and update and optimization may be actively triggered based on the latest live streaming content.

It should be noted that after the latest input data is obtained, an incremental analysis is performed instead of re-constructing the AI virtual character. That is, differences between new data and historical data are extracted to identify changes in personalized features of the target character, such as new changes in catchphrases, subtle changes in the timbre and tone due to status changes (such as changes in health and emotions), new iconic actions in the scope of behavioral habits, new tendencies in aesthetic preferences, new changes in appearance features, and the like. This method ensures the timeliness and authenticity of the AI virtual character, enhances dynamic adaptability, and strengthens deep binding with the target character.

Optionally, the method of the present disclosure further includes: When it is detected that the user triggers a preset hidden mechanism associated with the target AI virtual character, interactive presentation is performed through the target AI virtual character.

When it is detected that the user triggers the hidden mechanism, the target AI virtual character initiates and presents the interaction content corresponding to the hidden mechanism.

The existence of the hidden mechanism adds an "easter egg" attribute to the interaction, the user actively explores trigger conditions due to curiosity, and this process of "discovering surprises" significantly increases the fun of the interaction, stimulates the user's desire and enthusiasm to explore and participate, and enables to transform the interaction with the AI virtual character from "functional dialogue" to a more entertaining experience.

Optionally, the preset hidden mechanism includes at least one of the following:

Mechanism I: set a first keyword or a first interactive operation to trigger unlocking of a predefined expression for the target AI virtual character.

Mechanism II: set a second keyword or a second interactive operation to trigger unlocking of a predefined voice clip for the target AI virtual character.

Mechanism III: set a third keyword or a third interactive operation to trigger switching to a predefined outfit for the target AI virtual character.

Mechanism IV: set a fourth keyword or a fourth interactive operation to trigger generation of the stimulation parameter preset by the target character for the target AI virtual character.

The above first keyword, the second keyword, the third keyword, and the fourth keyword may be set by the target character, such as "comfortable", "you are great", "you are gentle", "I love you", and the like. The first interactive operation, the second interactive operation, the third interactive operation, and the fourth interactive operation may also be set by the target character, and for example, the user double-clicks on the target AI virtual character's cheek, the user draws a heart, the user clicks on the target AI virtual character's outfit, and the user nods three times in succession.

For example, in the mechanism I, when the keyword "you are great" is detected, unlocking a "shy and blushing" expression is triggered for the target AI virtual character.

In the mechanism II, when the keyword "I love you" is detected, unlocking an erotic voice clip is triggered for the target AI virtual character.

In the mechanism III, when it is detected that the user clicks on the target AI virtual character's outfit, switching to a predefined outfit is triggered for the target AI virtual character.

In the mechanism IV, when the keyword "just so" is detected, generation of the stimulation parameter preset by the target character is triggered for the target AI virtual character, i.e., the vibration amplitude or the vibration duration is increased.

That is, the present disclosure refines the content of the hidden mechanism from the dimensions of expression, voice, outfit, and control parameters, covering a plurality of aspects such as vision, hearing, and function control. The user may unlock diverse interaction content through different trigger modes, avoid the simplification of the hidden mechanism, and make the interactive experience more three-dimensional and rich. The target character may set different hidden mechanisms to deepen the personalization and exclusivity of the AI virtual character.

With reference to FIG. 3, the method for massage device control based on AI virtual characters provided in the present disclosure is fully described below. First, personalized feature cloning is performed, and the target character may provide multi-modal data, including but not limited to voice data, text data, video data, image data, and the like. Then, an AI virtual character corresponding to the target character is generated by cloning based on the multi-modal data, and the AI virtual character is endowed with personalized data corresponding to that of the target character. Next, an AI virtual character library is created and stored.

Then, an application process proceeds, mainly including user interaction and control phases. First, the user selects a target AI virtual character from the AI virtual character library, and then performs a multi-modal interaction through the target AI virtual character; and during this process, data processing is performed, and any one or more of tasks shown in FIG. 3 may be processed in parallel, e.g., tasks of invoking personalized features of the target AI virtual character, parsing interaction content, and parsing personalized features of the user may be processed simultaneously. Alternatively, only the task of parsing interaction content may be processed. Then, an AI algorithm model is used to generate a control parameter based on data processing content, and then the control parameter is sent to the massage device to control the massage device being used by the user.

Figure 4:
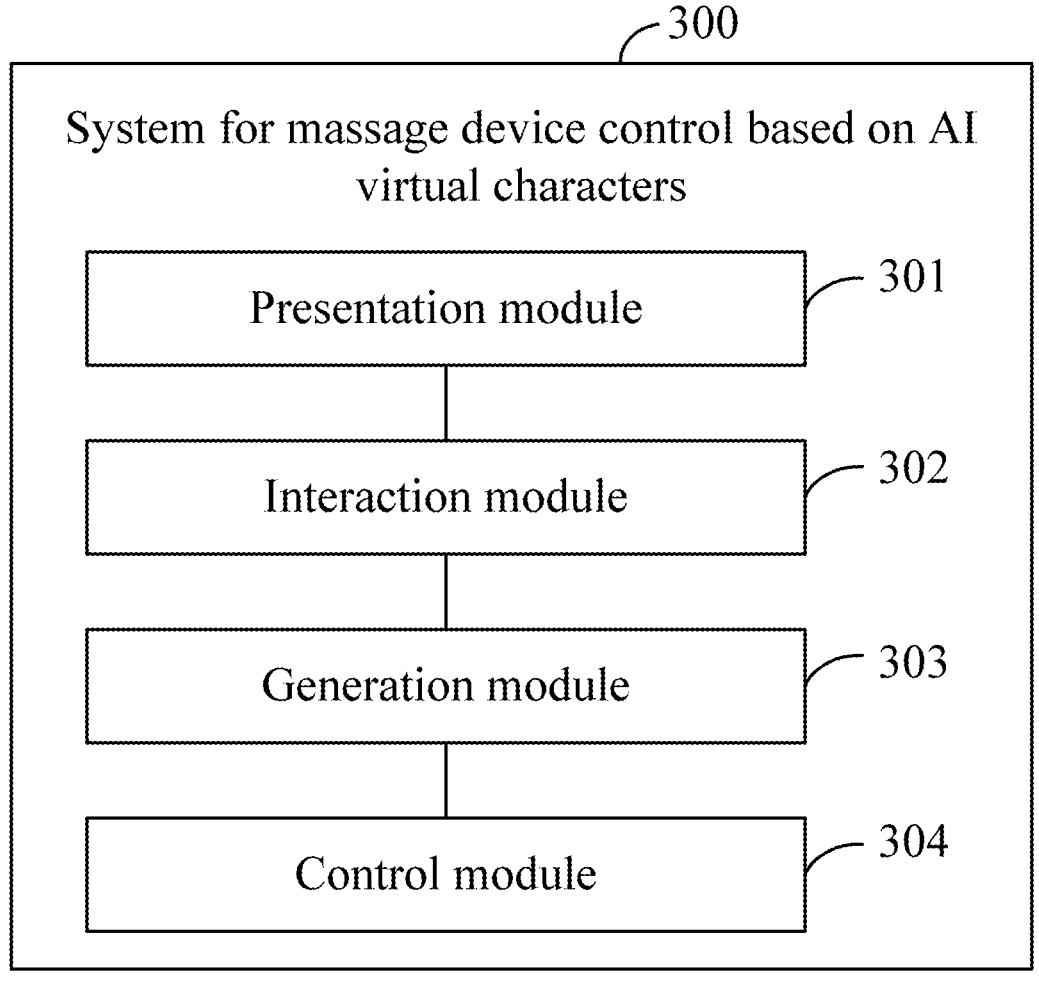
FIG. 4 is a block diagram of modules of a system for massage device control based on AI virtual characters provided in an embodiment of the present disclosure.

With reference to FIG. 4, based on the same inventive concept, the present disclosure provides a system 300 for massage device control based on AI virtual characters, and the system includes: a presentation module 301, configured to present a target AI virtual character selected by the user in response to the user's click operation, where different AI virtual characters have personalized features generated by cloning based on input data of a corresponding target character; an interaction module 302, configured to interact with the user through the target AI virtual character; a generation module 303, configured to generate a control parameter based on interaction content, or generate a control parameter based on the interaction content combined with personalized features of the target AI virtual character and/or personalized features of the user; and a control module 304, configured to control the user's massage device based on the control parameter.

Figure 5:
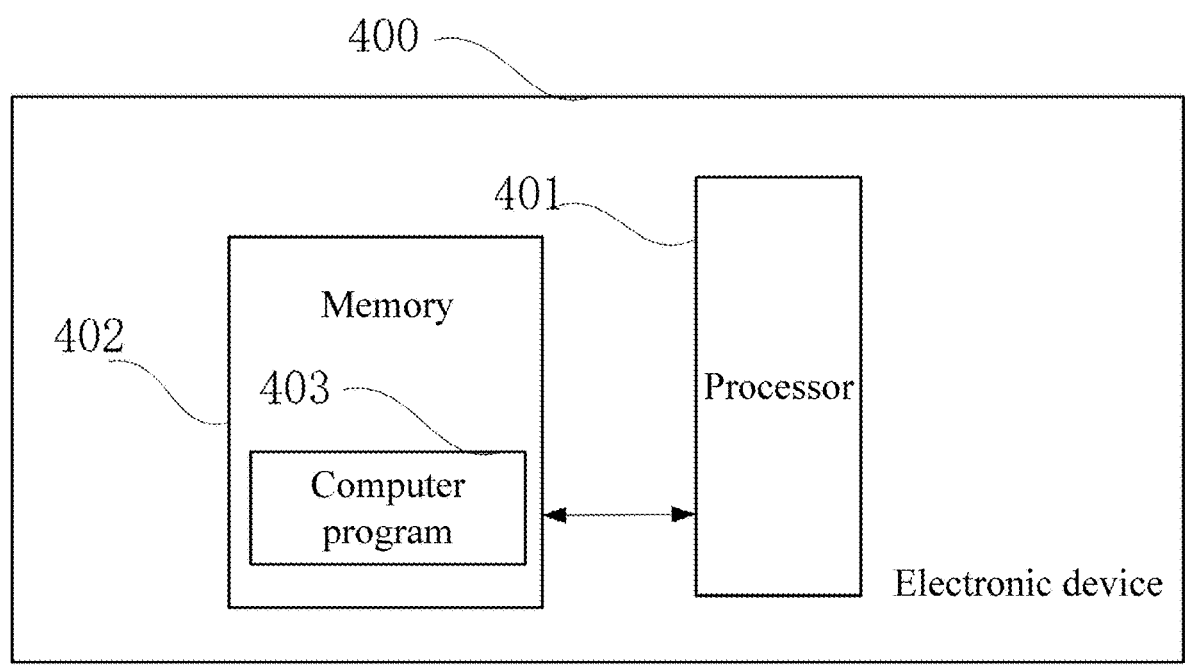
FIG. 5 is a block diagram of modules of an electronic device provided in an embodiment of the present disclosure.

With reference to FIG. 5, based on the same inventive concept, a block diagram of modules of an electronic device 400 that applies the above method is provided in an embodiment of the present disclosure. The electronic device 400 includes: at least one processor 401 (only one shown in FIG. 4), a memory 402, and a computer program 403 stored in the memory 402 and executable on the at least one processor 401, and when executing the computer program 403, the processor 401 implements the steps of the method in any of the foregoing embodiments.

The electronic device 400 may be a mobile phone, a tablet computer, or any other device with communication functions.

Those skilled in the art may understand that FIG. 4 illustrates merely an example of the electronic device 400 and does not constitute a limitation on the electronic device 400. The device may include more or fewer components than those shown in the figure, or combine certain components or different components.

The processor 401 can be a central processing unit (CPU), a microprocessor unit (MPU), and the processor 401 may further be any other general-purpose processor, a digital signal processor (DSP), an application specific integrated circuit (ASIC), a field-programmable gate array (FPGA), or any other programmable logic device (PLD), a discrete gate or a transistor logic device, or a discrete hardware component, etc. The general-purpose processor can be a microprocessor, or the processor can also be any conventional processor.

In some embodiments, the memory 402 may be an internal storage unit of the electronic device 400, such as a hard drive or a memory of the electronic device 400. In some embodiments, the memory 402 may further be an external storage device of the electronic device 400, such as a plug-in hard drive equipped for the electronic device 400, a smart media card (SMC), a secure digital (SD) card, a flash card, and the like. Further, the memory 402 may include both the internal storage unit and the external storage device of the electronic device 400.

It should be noted that the above system, device, and other content are based on the same inventive concept as the method embodiments of the present disclosure, and the method embodiments may be referred to for details of the modules designed for the system, the steps executed by the device, and the resulting technical effects, which will not be described in detail herein.

Those skilled in the art can clearly understand that for the convenience and brevity of the description, only the division of the above functional units and modules is used for illustration. In practical applications, the above functions can be assigned to different functional units and modules according to needs, that is, the internal structure of the device is divided into different functional units or modules to complete all or part of the functions described above. All functional units and modules in each of the embodiments of the present disclosure may be integrated into one processing unit, or may be independently and physically present, or two or more units may be integrated into one unit. The above integrated units may be implemented in the form of hardware, or may be implemented in the form of a software functional unit. Furthermore, specific names of all functional units and modules are merely or the convenience of distinguishing each other and are not intended to limit the scope of protection of the present disclosure. For the specific working process of the units and modules in the above system, reference may be made to the corresponding process in the foregoing method embodiments, and details are not described herein again.

In an embodiment of the present disclosure, a computer-readable storage medium is further provided. A computer program is stored in the computer-readable storage medium, and when the computer program is executed by the processor, the steps in each of the above method embodiments may be implemented.

In an embodiment of the present disclosure, a computer program product is provided, and when the computer program product runs on a mobile terminal, the mobile terminal may implement the steps in each of the above method embodiments when executing the computer program product.

If the integrated units are implemented in the form of the software functional units and sold or used as independent products, they may be stored in one computer-readable storage medium. Based on such understanding, the present disclosure implements all or part of processes of the methods in the above embodiments by instructing relevant hardware through a computer program. The computer program may be stored in a computer-readable storage medium, and when the computer program is executed by the processor, the steps in each of the above method embodiments may be implemented. The computer program includes computer program codes, and the computer program codes may exist in the form of source code, object code or executable files, or in some intermediate forms. The computer-readable medium may include at least: any entity or device capable of carrying a computer program code to a photographing device/electronic device, a recording medium, a computer memory, a read-only memory (ROM), a random access memories (RAM), an electrical carrier signal, a telecommunication signal, a software distribution medium, and the like, such as a USB flash drive, a mobile hard disk drive, a diskette, an optical disk, or the like.

In the above embodiments, each embodiment is described with its own emphasis. For parts that are not described in detail or recorded in a certain embodiment, please refer to the relevant descriptions of other embodiments.

Those of ordinary skill in the art may appreciate that the units and algorithm steps described in combination with the embodiments disclosed herein can be implemented through electronic hardware, or a combination of computer software and electronic hardware. Whether these functions are performed in electronic hardware or software depends on the specific application and design constraints of the technical solution. Those skilled in the art can use different methods to implement the described functions for each particular application, but such implementation should not be considered to be beyond the scope of the present disclosure.

In the embodiments provided by the present disclosure, it should be understood that the disclosed apparatus/network device and method may be implemented in other ways. For example, the embodiments of the apparatus/network device described above are merely illustrative. For example, division of the modules or units is merely a kind of division of logic functions, there may be other division modes in actual implementation, and for example, a plurality of units or assemblies may be combined or integrated into another system, or some features may be omitted or not executed. Furthermore, shown or discussed coupling or direct coupling or communication connection between each other may be an indirect coupling or communication connection by means of some interfaces, apparatuses or units, and may be in an electrical, mechanical or other form.

The unit described as a separable component may be physically separated or not, and a component shown as a unit may be a physical unit or not, that is, may be located at one place or may also be distributed on a plurality of network units. Part or all of the units may be selected according to actual needs to achieve the objective of the solution of the embodiments of the present disclosure.

The above embodiments are merely used to describe the technical solution of the present disclosure rather than limiting the same. Although the present disclosure has been described in detail with reference to the foregoing embodiments, those skilled in the art should understand that the technical solution described in the foregoing embodiments may still be modified, or some technical features therein may be equivalently substituted. However, these modifications or substitutions do not make the essence of the corresponding technical solution deviate from the spirit and scope of the technical solutions of each embodiment of the present disclosure, and shall fall within the protection scope of the present disclosure.

What is claimed is:

1. A method for massage device control based on AI virtual characters, comprising:

presenting a target AI virtual character selected by a user in response to a click operation of the user among different AI virtual characters, wherein the different AI virtual characters have personalized features generated by cloning based on input data of respective target characters;

interacting with the user through the target AI virtual character;

generating a control parameter based on interaction content, or generating a control parameter based on the interaction content combined with personalized features of the target AI virtual character and/or personalized features of the user; and controlling a massage device of the user based on the control parameter.

2. The method for massage device control based on AI virtual characters according to claim 1, wherein each of the different AI virtual characters is constructed through the following steps, comprising:

acquiring respective input data of a respective target character, wherein the respective input data comprises voice data and text data of the respective target character;

analyzing the respective input data of the respective target character to determine personalized features of the respective target character, wherein the personalized features of the respective target character comprise a timbre, tone, and language style of the respective target character; and constructing a respective AI virtual character corresponding to the respective target character according to the personalized features of the respective target character.

3. The method for massage device control based on AI virtual characters according to claim 2, wherein the respective input data of the respective target character further comprises character acquisition data of the respective target character;

the constructing a respective AI virtual character corresponding to the respective target character according to the personalized features of the respective target character further comprises:

analyzing the character acquisition data of the respective target character to determine the personalized features of the respective target character, wherein the personalized features of the respective target character further comprise behavioral habits of the respective target character;

determining a virtualized modeling image corresponding to the respective target character according to the character acquisition data of the respective target character; and constructing the respective AI virtual character corresponding to the respective target character according to the personalized features of the respective target character and the virtualized modeling image corresponding to the respective target character.

4. The method for massage device control based on AI virtual characters according to claim 3, wherein the respective input data further comprises image data of the respective target character;

the method further comprises:

determining aesthetic preferences of the respective target character according to the image data and the character acquisition data of the respective target character; and determining a scenario background of the respective AI virtual character corresponding to the respective target character according to the aesthetic preferences of the respective target character.

5. The method for massage device control based on AI virtual characters according to claim 1, wherein for each of the different AI virtual characters, the personalized features comprise a language style of a respective target character;

the interacting with the user through the target AI virtual character comprises:

outputting a text dialogue response through the target AI virtual character according to an input content of the user; and wherein the text dialogue response is text dialogue content that conforms to the language style of a respective target character corresponding to the target AI virtual character and is output by the target AI virtual character.

6. The method for massage device control based on AI virtual characters according to claim 1, wherein for each of the different AI virtual characters, the personalized features comprise a timbre and tone of a respective target character;

the interacting with the user through the target AI virtual character comprises:

outputting a voice dialogue response through the target AI virtual character according to an input content of the user; and wherein the voice dialogue response is synthesized voice content that conforms to the timbre and tone of a respective target character corresponding to the target AI virtual character and is output by the target AI virtual character.

7. The method for massage device control based on AI virtual characters according to claim 6, wherein for each of the different AI virtual characters, the personalized features further comprise behavioral habits of the respective target character; and the method further comprises:

driving the target AI virtual character to perform expressions and actions that conform to the behavioral habits of the respective target character corresponding to the target AI virtual character during an interaction.

8. The method for massage device control based on AI virtual characters according to claim 1, wherein the personalized features of the user comprise at least one of the user's age, gender, preference settings, data of using the massage device, and physiological response feedback.

9. The method for massage device control based on AI virtual characters according to claim 1, wherein the generating a control parameter based on the interaction content combined with personalized features of the target AI virtual character and/or personalized features of the user comprises:

inputting the interaction content into an intelligent analysis module, and analyzing through the intelligent analysis module to determine a characteristic parameter; and generating the control parameter based on the characteristic parameter combined with the personalized features of the target AI virtual character and/or the personalized features of the user.

10. The method for massage device control based on AI virtual characters according to claim 9, wherein the characteristic parameter represents an emotion category of the target AI virtual character extracted from the interaction content.

11. The method for massage device control based on AI virtual characters according to claim 9, wherein the generating a control parameter based on the characteristic parameter combined with personalized features of the target AI virtual character and personalized features of the user comprises:

determining a personality tag of the target AI virtual character according to the personalized features of the target AI virtual character, wherein the personality tag of the target AI virtual character corresponds to a stimulation parameter preset by a respective target character corresponding to the target AI virtual character, or the personality tag of the target AI virtual character corresponds to a stimulation parameter set by a system;

generating an initial control parameter based on the stimulation parameter corresponding to the personality tag of the target AI virtual character and the characteristic parameter; and adjusting the initial control parameter based on the personalized features of the user to obtain the control parameter.

12. The method for massage device control based on AI virtual characters according to claim 9, wherein the generating a control parameter based on the characteristic parameter combined with personalized features of the target AI virtual character and personalized features of the user comprises:

generating a first control parameter based on the characteristic parameter and the personalized features of the target AI virtual character;

generating a second control parameter based on the personalized features of the user; and generating the control parameter by performing weighted calculation on the first control parameter and the second control parameter.

13. The method for massage device control based on AI virtual characters according to claim 9, wherein the generating a control parameter based on the characteristic parameter combined with personalized features of the target AI virtual character and personalized features of the user comprises:

generating the control parameter by inputting the characteristic parameter, the personalized features of the target AI virtual character, and the personalized features of the user into a pre-constructed multi-modal analysis model.

14. The method for massage device control based on AI virtual characters according to claim 1, further comprising:

automatically generating a personalized image and/or a short video clip based on a process of interaction between the target AI virtual character and the user; and storing the personalized image and/or the short video clip.

15. The method for massage device control based on AI virtual characters according to claim 1, wherein the different AI virtual characters are continuously updated based on latest the input data of the respective target characters.

16. The method for massage device control based on AI virtual characters according to claim 1, wherein the control parameter comprises at least one of a vibration frequency, a vibration amplitude, a vibration duration, a massage device temperature, and a massage direction.

17. The method for massage device control based on AI virtual characters according to claim 1, further comprising:

when it is detected that the user triggers a preset hidden mechanism associated with the target AI virtual character, interactive presentation is performed through the target AI virtual character.

18. The method for massage device control based on AI virtual characters according to claim 17, wherein the preset hidden mechanism comprises at least one of the following:

setting a first keyword or a first interactive operation to trigger unlocking of a predefined expression for the target AI virtual character;

setting a second keyword or a second interactive operation to trigger unlocking of a predefined voice clip for the target AI virtual character;

setting a third keyword or a third interactive operation to trigger switching to a predefined outfit for the target AI virtual character; and setting a fourth keyword or a fourth interactive operation to trigger generation of a stimulation parameter preset by a respective target character corresponding to the target AI virtual character for the target AI virtual character.

19. A system for massage device control based on AI virtual characters, comprising:

a presentation module, configured to present a target AI virtual character selected by a user in response to a click operation of the user among different AI virtual characters, wherein the different AI virtual characters have personalized features generated by cloning based on input data of respective target characters;

an interaction module, configured to interact with the user through the target AI virtual character;

a generation module, configured to generate a control parameter based on interaction content, or generate a control parameter based on the interaction content combined with personalized features of the target AI virtual character and/or personalized features of the user; and a control module, configured to control a massage device of the user based on the control parameter.

20. An electronic device, comprising a processor, wherein the processor is configured to execute a computer program to implement the following method steps comprising:

presenting a target AI virtual character selected by a user in response to a click operation of the user among different AI virtual characters, wherein the different AI virtual characters have personalized features generated by cloning based on input data of respective target characters;

interacting with the user through the target AI virtual character;

generating a control parameter based on interaction content, or generating a control parameter based on the interaction content combined with personalized features of the target AI virtual character and/or personalized features of the user; and controlling a massage device of the user based on the control parameter.

* * * * *